United States Patent [19]
Aruga et al.

[11] Patent Number: 4,967,293
[45] Date of Patent: Oct. 30, 1990

[54] MULTI-POSITIONER MAGNETIC DISK STORAGE APPARATUS HAVING MEANS FOR REDUCING MECHANICAL VIBRATION INTERFERENCE BETWEEN POSITIONERS

[75] Inventors: Keiji Aruga, Hiratsuka; Yoshifumi Mizoshita, Tama; Masahito Iwatsubo, Kawasaki; Toshifumi Hatagami, Machida, all of Japan

[73] Assignee: Fujitsu Limited, Kawasaki, Japan

[21] Appl. No.: 228,942

[22] Filed: Aug. 5, 1988

[30] Foreign Application Priority Data

Aug. 11, 1987 [JP] Japan ............................. 62-201515
Sep. 14, 1987 [JP] Japan ............................. 62-230568

[51] Int. Cl.$^5$ ............................................... G11B 5/55
[52] U.S. Cl. ................................. 360/78.12; 360/106; 360/75; 369/247
[58] Field of Search ....................... 318/625; 369/247; 360/75, 78.12, 106

[56] References Cited

U.S. PATENT DOCUMENTS 4,040,103  8/1977  White ................................. 360/75
4,331,990  5/1982  Frandsen ..................... 360/78.12 X
4,423,448  12/1983  Frandsen ..................... 360/78.12 X
4,616,277  10/1986  Berti ............................... 318/625 X

FOREIGN PATENT DOCUMENTS 0164642  12/1985  European Pat. Off. .
0217460   4/1987  European Pat. Off. .
0264535   4/1988  European Pat. Off. .

OTHER PUBLICATIONS

Patent Abstracts of Japan, vol. 9, No. 161, (P-370), Jul. 5, 1985; JP-A-60 035 377.

Primary Examiner—Vincent P. Canney
Assistant Examiner—David L. Robertson
Attorney, Agent, or Firm—Staas & Halsey

[57] ABSTRACT

A magnetic disk storage apparatus in which a plurality of magnetic head positioners are independently driven with respect to each other. A housing having a sensor secured thereto indirectly senses mechanical vibration of a magnetic disk and issues a sense signal. The mechanical vibration is inevitably caused by a seek operation of a selected magnetic head positioner. Based on the sense signal, a compensating signal is generated in a mechanical vibration follow-up system disposed in the apparatus. The compensating signal is input to a coil of a driving motor of non-selected magnetic head positioners such that the effect of the mechanical vibration on the other positioners is cancelled. Thus, magnetic heads supported by the other positioners do not become off-track.

35 Claims, 9 Drawing Sheets

FIG. 1
PRIOR ART
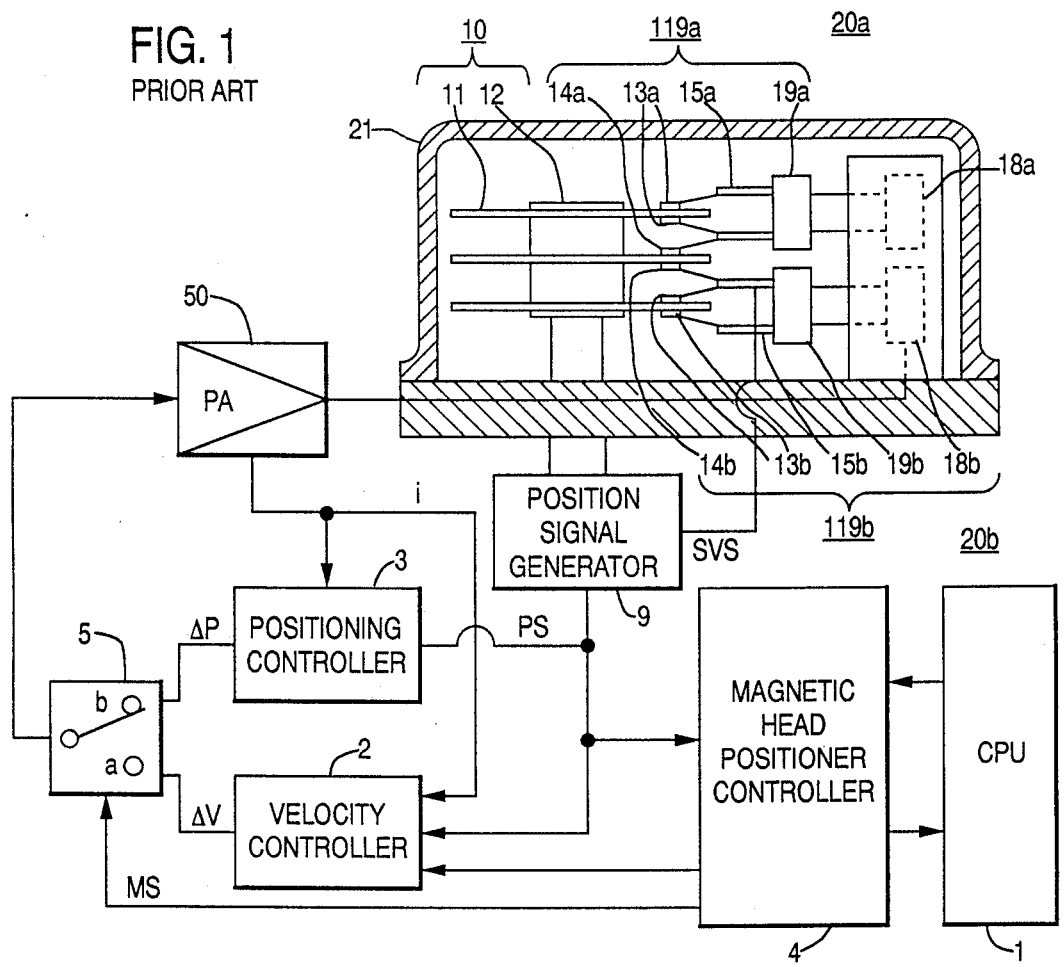
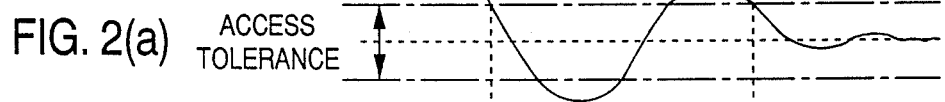
FIG. 2(a) ACCESS TOLERANCE
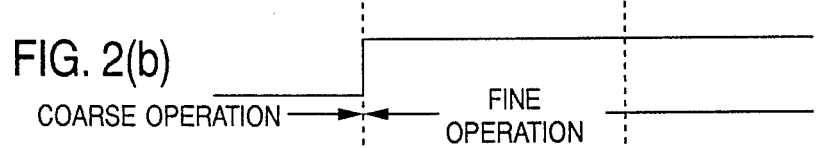
FIG. 2(b) COARSE OPERATION — FINE OPERATION
FIG. 2(c) t5  T1  T2  TIME

MULTI-POSITIONER MAGNETIC DISK STORAGE APPARATUS HAVING MEANS FOR REDUCING MECHANICAL VIBRATION INTERFERENCE BETWEEN POSITIONERS

BACKGROUND OF THE INVENTION

The present invention is directed to a control system for magnetic head positioners (hereinafter, simply referred to as positioners) disposed in a multi-positioner magnetic disk storage apparatus. In particular, the present invention is directed to a control system for preventing a magnetic head from becoming off-track during a read/write operation due to a mechanical vibration caused by a simultaneous seek operation by other magnetic heads. Furthermore, the present invention is directed to a system for compensating a driving signal for a positioner during a read/write operation such that an adverse effect due to a mechanical vibration caused by a seek operation by other positioners is cancelled. In order to do this, the mechanical vibration is sensed with an acceleration sensor disposed on the surface of a housing of the relevant magnetic storage apparatus.

The requirement for increased storage capacity of a magnetic disk has substantially increased to a track density of approximately 1200 tracks/inch, that is, a track pitch of 20 micrometers. During a read/write operation, the magnetic head must be accurately positioned on a track formed on the magnetic disk. Although the accuracy is on the order of sub-microns even greater accuracy is required.

A magnetic disk storage apparatus usually includes a plurality of magnetic disks assembled around a rotating spindle forming a magnetic disk assembly. Due to the vast quantity of information stored in the magnetic assembly, concurrent access occurs where two or more positioners are being accessed simultaneously. As a countermeasure against concurrent access a multi-positioner magnetic disk storage apparatus having plural positioners which operate independently from each other has been developed.

A positioner performs two kinds of operations; a seek operation which may be referred to as a coarse access operation, and a track follow-up operation, which may be referred to as a fine access operation. During the seek operation the positioner operates to transfer the relevant magnetic head supported by the positioner from the present track to a target track under control of a central controller, which may be, for example, a computer. The track following operation starts when the magnetic head reaches a position extremely near the target track. The positioner is driven such that the magnetic head can accurately follow the target track for a read/write operation. When the magnetic head is in this state it is referred to as being "on track". Naturally, in a multi-positioner magnetic disk apparatus, there occurs a situation where one of the positioners is performing a follow-up operation and at the same time another one of the positioners is performing a seek operation. The positioner performing the seek operation is driven with a high accelerating force during the seek operation so that it is subject to a strong reaction force. The reaction force causes a strong mechanical vibration of the storage apparatus, causing the magnetic head supported by the positioner performing the read/write operation to be off-track. Such mechanical interference between the positioners has been a serious, inevitable problem inherent to multi-positioner magnetic disk storage apparatus.

Apparently, when all the magnetic heads are performing read/write operations, such problem does not occur.

There are two types of positioners used in a magnetic disk storage apparatus; a linear type positioner and a rotary type positioner. In a linear type positioner the magnetic heads are driven in a radial direction towards the center of a rotating magnetic disk assembly. In a rotary-type positioner the magnetic heads are driven along an arc across a magnetic disk surface, and the positioner rotates in a clockwise and counterclockwise direction around a rotating axis of the positioner. In a multi-positioner magnetic disk storage apparatus having linear-type positioners, the above-described mechanical interference is more serious in comparison with a multi-positioner magnetic disk storage apparatus having rotary-type positioners. This is because the reaction force of the linear-type positioner is much higher than that of the rotary-type positioner. Particularly, when linear-type positioners are stacked one above another and the moving directions of the magnetic heads are the same, the full reaction force adversely affects the positioners during a read/write operation.

FIG. 1 is a schematic diagram of a prior art control system of a multi-positioner magnetic disk storage apparatus. In the magnetic disk storage apparatus a plurality of magnetic disks 11 (shown as three disks) as recording media are stacked in parallel with fixed spaces therebetween, around a spindle 12 which is rotated by a motor (not shown), forming a magnetic disk assembly 10. Two pairs of read/write heads 13a and 13b, and servo-heads 14a and 14b are supported by positioners 20a and 20b, respectively, through head arms 15a and 15b. Both positioners 20a and 20b are driven independently under control of respective control circuits (only one series of circuits is shown in FIG. 1). The head arms 15a and 15b are fixed to carriages 19a and 19b which are driven by voice coil motors 18a and 18b (hereinafter referred to as VCMs) along respective seek directions or access directions. The VCMs 18a and 18b include drive coils 16a and 16b (not shown in FIG. 1), magnets 17a and 17b (not shown in FIG. 1) and magnetic circuits including yokes (not shown). The magnetic heads 13a, 13b, 14a and 14b, the head arms 15a and 15b, and the carriages 19a and 19b form moving bodies 19a and 9b, respectively. Usually, the magnetic 1 head positioners 20a and 20b and magnetic disk assembly 10 are installed within a dust proof housing 21.

The control circuits of the positioners are now described. A position signal generator 9 receives servo-signals SVS sent from the servo head 14a and outputs position signals PS. A velocity controller 2 receives the position signal PS and generates velocity error signals $\Delta V$. A magnetic head positioner controller 4, in response to access command signals sent from a central computer (CPU) I, controls the velocity controller 2 to output the velocity error signals $\Delta V$ for controlling coil current of the VCM 18a, which controls the rotating speed of the VCM 18a. In addition, when the magnetic head 14a is in the vicinity of the target track the magnetic head positioner controller 4 issues a coarse/fine switching signal MS to activate a switch 5.

A positioning controller 3 receives and amplifies the position signal PS, performs integral processing and differential processing (P-I-D processing), and adds a detection current i output from a power amplifier 50 to the processed position signal PS. The resultant current is then filtered through a low-pass filter (not shown), thus generating a position error signal ΔP. The switch 5 operates such that the velocity error signal ΔV is sent to the power amplifier 50 as a coarse access signal, and the position error signal ΔP is sent to the power amplifier 50 as a fine access signal. Both the position error signal ΔP and velocity error signal ΔV are amplified by the power amplifier 50 and input to the coil of the VCM 18a.

FIGS. 2(a)-2(c) are timing diagrams of the switching operation of the switch 5. As will be described later, these timing diagrams are applicable to magnetic disk storage apparatus according to the present invention. The ordinates of FIGS. 2(a), 2(b) and 2(c) show the distance between a target track (or a target cylinder) and the present position of the relevant magnetic head, the signal height of a coarse/fine switching signal MS, and the signal height of a seek end signal, respectively. The abscissa is with respect to time.

The operation of the magnetic head positioner control system of the prior art magnetic disk storage apparatus shown in FIG. I is described briefly with reference to FIG. 2. The seek operation is performed as follows. The magnetic head positioner controller 4, after receiving an access command signal from the CPU 1, calculates the distance, e.g., the number of tracks, between the target track and the present position of the magnetic head 14, and generates a criterion velocity Vc by referring to a velocity-time function having a predetermined storage pattern having, for example, a trapezoidal shape. The position signal generator 9 generates a position signal PS based on the servo-signal SVS supplied from the servo-head 14. A real velocity Vr is generated in the velocity controller 2 by processing the position signal PS output from the position signal generator 9. The velocity error signal ΔV is generated in the velocity controller 2 by comparing the real velocity signal Vr with the criterion velocity Vc, and the comparison signal is output to a terminal a of the switch 5. At this stage, the terminal a is in an ON state due to the absence of the coarse/fine switching signal MS. Thus, the velocity error signal ΔV is input to the power amplifier 50 where it is amplified and applied to the coil of the VCM 18. As a result, the positioner 20 is driven with a velocity which varies following the trapezoidal time pattern. That is, the positioner 20 is subject to acceleration, non-acceleration and deceleration in that order. Substantially strong reaction forces are caused in the access direction in which the moving member 119a of the positioner 20a is driven.

When the magnetic head positioner controller 4 detects that the servo-head 14 has reached the vicinity of the target track within a predetermined tolerance at time $T_1$ as indicated in FIG. 2(a), then a fine/coarse switching signal MS is issued from the controller 4 to the switch 5, turning the terminal b ON and the terminal a OFF. As a result, application of the velocity error signal ΔV to the power amplifier 50 is terminated and the position error signal ΔP output from the positioning controller 3 is applied to the amplifier 50, as indicated in FIG. 2(b). Thus, the positioner 20 performs a fine access operation or track following operation.

The position signal PS generated by the servo-head 14 in accordance with the servo-signal SVS is amplified by the power amplifier 50 and applied to the coil of the VCM 18a . Thus, the off-track of the servo-head 14 is corrected. After a settling time $t_s$ elapses from the time $T_1$, a seek end signal SE is issued from the magnetic head positioner controller 4 at time $T_2$ as indicated in FIG. 2(c). This allows a read/write operation by the magnetic heads 13.

The capability of the above-described prior art control system for preventing the magnetic head from becoming offtrack, e.g., for preventing a servo-gain in the system, is limited to within a predetermined value. Furthermore, the limit is narrowed by the mechanical interference between a positioner during a seek operation and a positioner during a read/write operation, causing mechanical vibration of the apparatus due to the reaction force of the positioner during the seek operation. This mechanical interference is inevitable in a multi-positioner magnetic disk storage apparatus. The adverse effect becomes more serious when the resonant frequency of the mechanical vibration is low.

There are several proposals for overcoming the above problems caused by mechanical vibration. In order to minimize the shock of the reaction force caused by a positioner during a seek operation, an elastic suspension mechanical system for the positioners was proposed by the inventors of the present invention wherein the fixed portions of positioners such as the yoke, coils, and magnets, are suspended against a housing of the magnetic disk storage apparatus by spring plates. Damping elements are disposed between the housing and the fixed portions of the positioners. By this mechanism, the mechanical shock is reduced a certain degree, but a mechanical resonant vibration of 100 to 150 Hz is caused. Thus, the proposals for preventing the magnetic heads from becoming off-track is still unsatisfactory.

Japanese Provisional Published Laid Open Patent Application No. 60-121578 published on June 29, 1985, and No. 61-170967 published on Aug. 1, 1986, both to *Moriya et al.*, disclose an optical disk storage apparatus. In the apparatus in the *Moriya et al.* references, an acceleration sensor secured to a housing of the apparatus detects mechanical vibration caused by an external force subjected to the apparatus. The optical storage apparatus of the *Moriya et al.* references is a single positioner type. Mechanical interference is not a problem, and is therefore, not disclosed by the *Moriva et al.* reference. A low-pass filter having a band width ranging from 1 Hz to 1000 Hz is used to filter signals output from the acceleration sensor to eliminate high frequency noise contained in the signal.

Therefore, a magnetic disk storage apparatus capable of overcoming the mechanical interference problem between plural positioners during operation is needed.

SUMMARY OF THE INVENTION

An object of the present invention is to overcome the above-described problems of the prior art, particularly that of mechanical interference. Therefore, the present invention provides a multi-positioner magnetic disk storage apparatus with means for preventing magnetic heads from becoming off-track during a read/write operation caused when a seek operation is performed by another positioner. Another object of the present invention is to provide a system including means for detecting mechanical vibration caused by positioners during a seek operation, and means for compensating the driving current of a coil of a voice control motor (VCM) of a positioner during a simultaneous read/write operation based on the detected mechanical vibration for eliminating the undesirable mechanical vibration.

FIG. 3(a) is a circuit diagram of a prior art magnetic disk storage apparatus and FIG. 3(b) is a circuit diagram of a magnetic disk storage apparatus according to the present invention. FIGS. 3(a) and 3(b) illustrate only the means for performing a fine access operation to show the difference between the prior art magnetic disk storage apparatus and the present invention magnetic disk storage apparatus. In the prior art magnetic disk storage apparatus shown in FIG. 3(a), two series of mutually independent fine access circuits, including positioning controllers 3a and 3b, are disposed with respect to two magnetic servo-heads 14a and 14b. Position error signals ΔPa and ΔPb are output from the positioning controllers 3a and 3b, respectively, and input to amplifiers 50a and 50b to control VCMs 18a and 18b respectively.

In the magnetic disk storage apparatus according to the present invention shown in FIG. 3(b), an acceleration sensor 6 secured to a housing 21 of the magnetic disk storage apparatus and a vibration follow-up circuit 7 are provided. The operation of positioner 20a performing a seek operation and positioner 20a performing a read/write operation is described below.

The sensing current from the sensor 6 indicates the presence of mechanical vibration caused by the seek operation of the magnetic head positioner 20a and is input to the vibration follow-up circuit 7. The sensing current is filtered by a low-pass filter 71 and converted into a mechanical vibration follow-up signal ΔS which is added to position error signal ΔPb issued from the positioning controller 3b through an adder 8b. The composed signal in the adder 8a is input to a power amplifier 50b to drive a VCM 18b of the positioner 20b such that the effect of the mechanical vibration is compensated and good track following of the magnetic head 14b is achieved. When the positioner 20a is performing a read/write operation and the positioner 20b is performing a seek operation, the positioner controlling system works in a similar manner.

The above-described mechanical compensation of a reaction force caused by a positioner during a seek operation, is performed under the following conditions. Assuming that m denotes the mass of a moving portion 119 of a positioner 20, $\alpha$ is detected acceleration along the access direction of the positioner caused by a seek operation of another positioner, and B1 denotes a positioner force constant (a driving force subjected to a positioner per unit coil current of the associated VCM contained in the positioner), the compensating current $i_{comp}$ is given by:

$$i_{comp} = m\alpha/B1$$

since, the force subjected to the positioner is equal to $m\alpha$.

In practice, there is no mutual displacement between the mechanical vibration of the housing 21 at a low frequency and that of the magnetic disks 11 enclosed in the housing 21 and a delay does not occur. The movement of the magnetic disks 11, therefore, can be detected indirectly by the housing 21 which is sensed by the acceleration sensor 6 secured to the housing 21. This requires that the electrical characteristics of the low-pass filter 71 be free from any phase shift. In comparison with a conventional low-pass filter, the phase shift must have a specified frequency, maintained within a few degrees such as 10 degrees, between an input waveform and an output waveform. The limited phase shift compensates for the adverse effect of the mechanical interference between both positioners. Of course, it is desirable that the low-pass filter have flat gain characteristics in the specified low frequency region, and low gain characteristics in a high frequency region.

The features and advantages of the present invention will be apparent by the following description of the embodiments and claims, and by referring to the drawings, wherein like reference numerals represent like parts.

BRIEF DESCRIPTION OF THE DRAWINGS

FIG. 1 is a schematic diagram of a prior art control system of a multi-positioner magnetic disk storage apparatus;

FIGS. 2(a)–2(c) are timing diagrams of the switching operation of the switch 5 in FIG. 1;

DESCRIPTION OF THE PREFERRED EMBODIMENTS

Figure 3A:
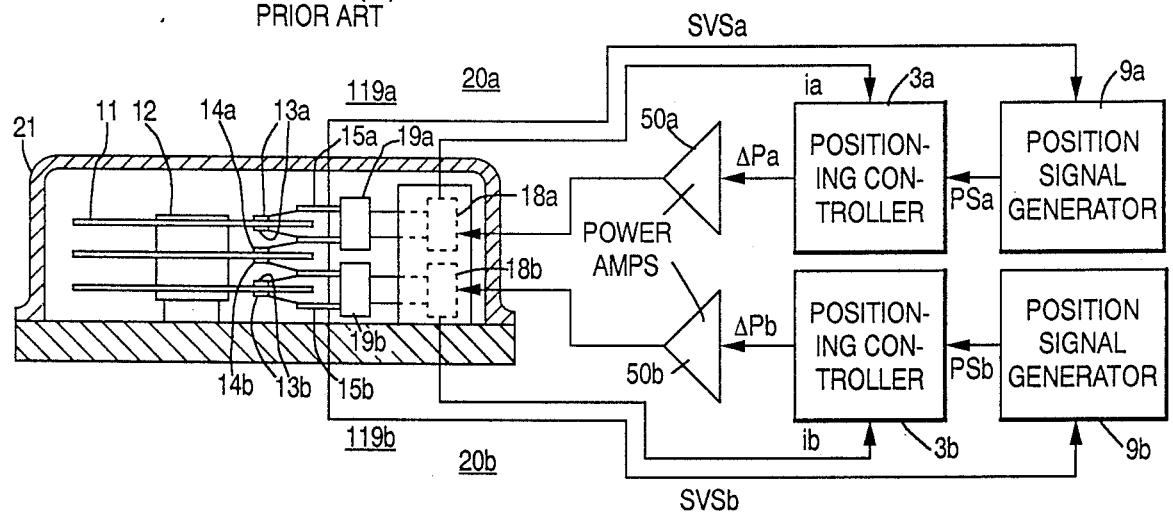
FIG. 3(a) is a circuit diagram of a prior art magnetic disk storage apparatus for performing a fine-access operation.
Figure 3B:
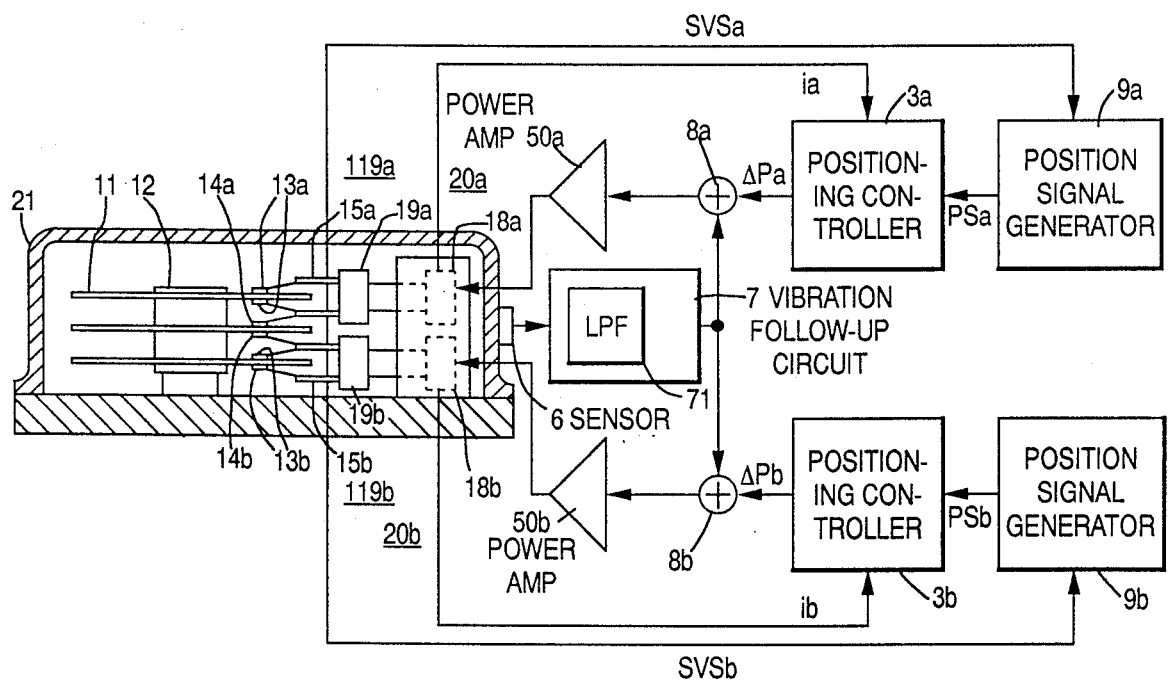
FIG. 3(b) is a circuit diagram of a magnetic disk storage apparatus according to the present invention for performing a fine-access operation.

In the following description, unless otherwise mentioned, the embodiment of a magnetic disk storage apparatus in FIG. 3(b) is assumed to be a multi-positioner magnetic disk storage apparatus having two linear-type positioners 20a and 20b stacked one above the other, supporting read/write heads 13a and 13b and servo-heads 14a and 14b. Both positioners 20a and 20b operate independently of each other. The access directions of each magnetic head coincide with each other, and are one of the radial directions of a relevant magnetic disk 11. Hereinafter, the suffixes a and b will be omitted if distinguishing between the positioners 20a and 20b is not necessary.

As stated before, the mechanical vibration of the magnetic disk storage apparatus caused by a seek operation of a positioner has the following characteristics. In a low frequency region on the order of hundreds of Hz, the phase shift between mechanical vibrations of the magnetic disks 11 and a housing 21 is negligibly small and the amplitude of the mechanical vibrations is relatively large. The mechanical vibration of the magnetic disk 11, therefore, can be represented by the mechanical vibration of the housing 21. In contrast, in a high frequency region the phase shift is substantially large, but the vibration amplitude is favorably small. Therefore, in the present invention, the high frequency mechanical vibration can be neglected. This phenomenon was confirmed experimentally and practically by the inventors of the present invention.

Figure 4A:
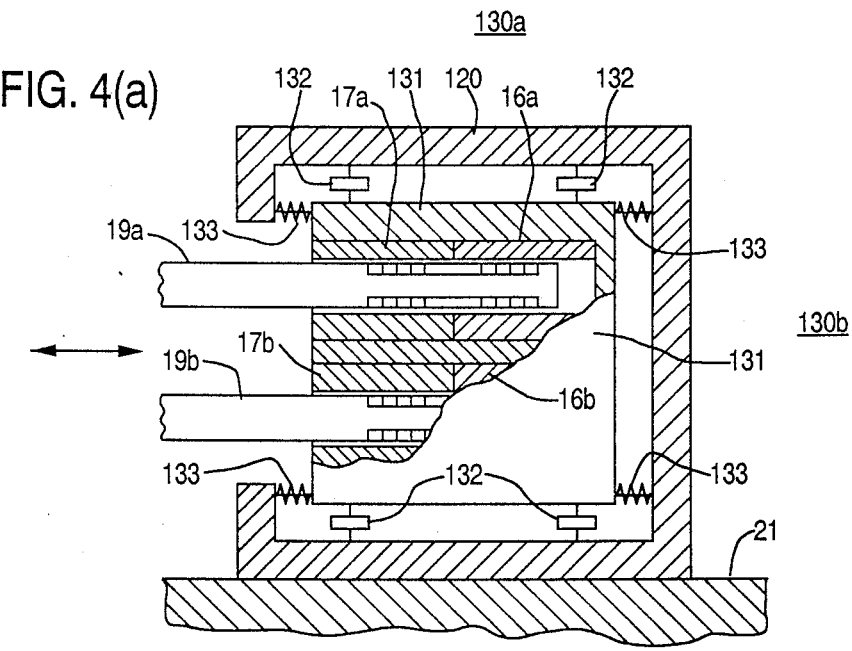
FIG. 4(a) is a partial cross-sectional view of an elastic suspension structure for supporting a positioner.
Figure 4B:
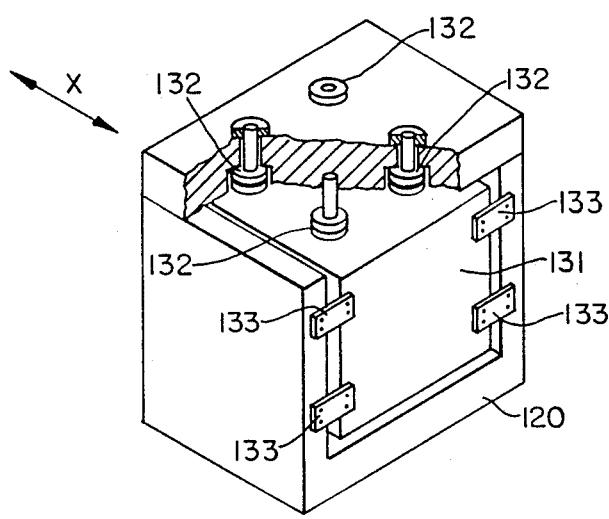
FIG. 4(b) is a partially broken perspective view of the elastic suspension structure in FIG. 4(a)

Before proceeding further, a suspending structure of the positioners 20 (20a and 20b) is described. FIG. 4(a) is a partial cross-sectional view of a suspending structure, and FIG. 4(b) is a partial broken perspective view of the positioners. The suspending structure is adopted in order to relax the shock of the reaction force caused by a positioner during a seek operation, as described before. The moving portion of the positioner 20 including a carriage 19 is guided by a guide structure including ball bearings (not shown) and is driven in the access direction (indicated by a twin arrowhead line X) by a magnetic force generated by a coil 16 of the associated VCM 18. Fixed portions of the positioners 20, comprising a magnetic circuit 130 of the VCM 18 including the coil 16, magnets 17, and a yoke 131, are elastically suspended inside a VCM housing 120 which is secured to the housing 21. Elastic movement in the X access direction of the positioners 20 is allowed by spring plates 133 bridging the outer surface of the yoke 131 and the VCM housing 120. Shearing dampers 132 are disposed between the inside surface of the housing 120 and the outer surface of the yoke 131 and provide an appropriate damping effect for the mechanical vibration of the housing 21. Each of the shearing dampers 132 has an elastic gum layer which is deformed by the relative displacement between the VCM housing 120 and the yoke 131 along the X access direction. The gum layer is subject to shearing force, thus absorbing energy of the relevant mechanical vibration. As a result, the effect of a reaction force caused by a positioner during a seek operation is substantially relaxed and the mechanical vibration of a frequency higher than 300 Hz is eliminated. Thus, the magnetic heads do not become off-track during a read/write operation. On the other hand, mechanical vibration along the X access direction having a resonant frequency of approximately 150 Hz is newly generated. Therefore, a further effective countermeasure to reduce the off-track of the magnetic heads is still required. The above-described problem is overcome by providing a positioner control means having an acceleration sensor 6 secured to the housing 21.

Figure 5:
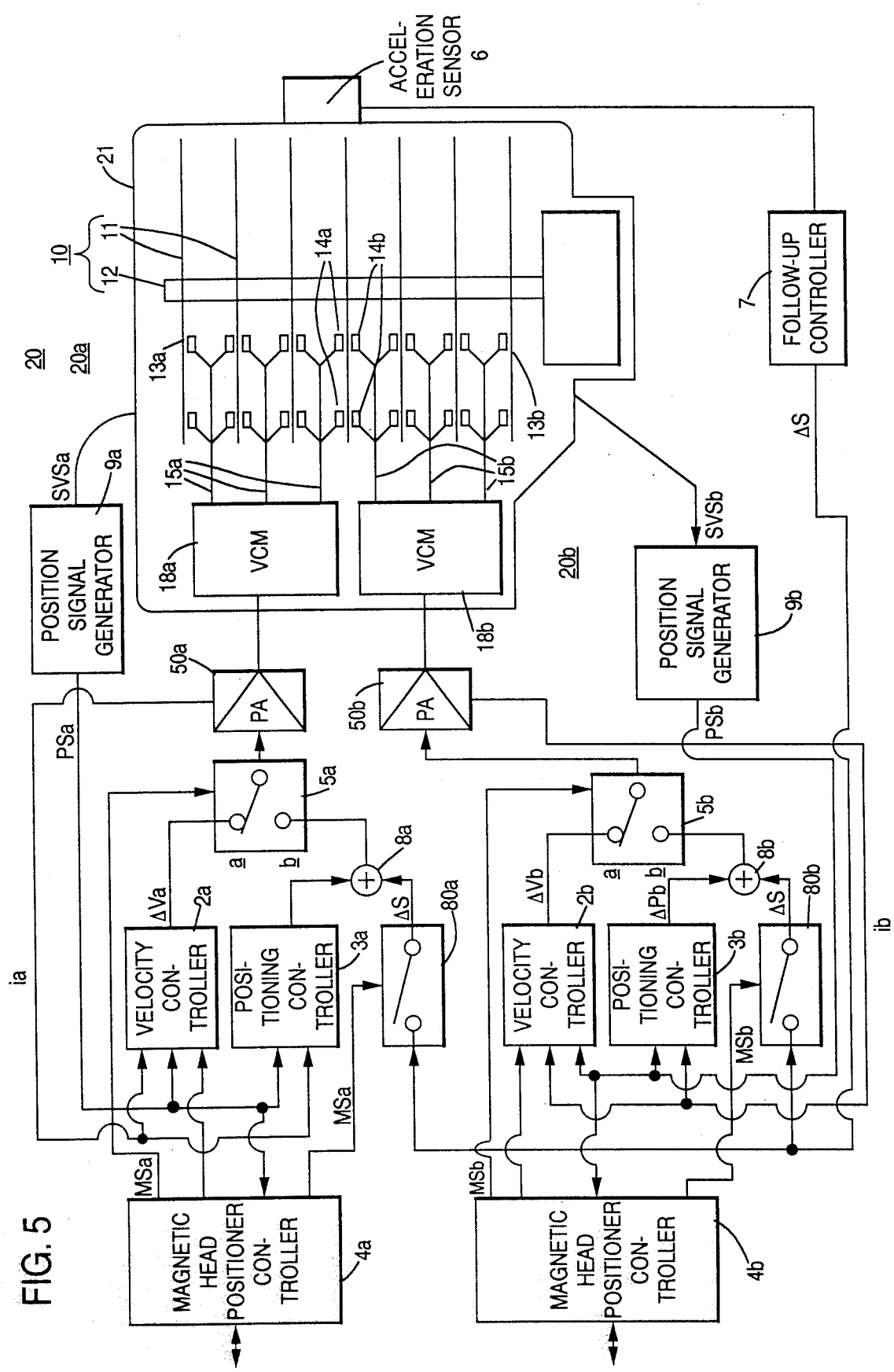
FIG. 5 is a circuit diagram of a positioner control system for a two-positioner magnetic disk storage apparatus according to a first embodiment of the present invention.

FIG. 5 is a circuit diagram of a positioner control system for a two-positioner magnetic disk storage apparatus according to a first embodiment according to the present invention. The apparatus has a conventional magnetic disk assembly 10 having seven magnetic disks 11 disposed around a spindle 12, and two linear-type positioners 20a and 20b. Each positioner 20a or 20b supports a set of three read/write heads 13a or 13b, and one servo-head 14a or 14b through a head arm 15a or 15b for driving the magnetic heads in an access direction. The above-described magnetic disk assembly 10 and positioners 20a and 20b are enclosed in a dust proof housing 21 and are conventional.

Two series of circuits are respectively provided for each of the positioners 20a and 20b. The series of circuits include magnetic head positioner controllers 4a and 4b, velocity controllers 2a and 2b, switches 5a and 5b, power amplifiers 50a and 50b, position signal generators 9a and 9b, and positioning controllers 3a and 3b. Both series of circuits are conventional circuits and operate upon receipt of access commands from a central computer (not shown). Both series of circuits are operated independently of each other resulting in mechanical interference between both positioners as described before.

According to the present invention, a mechanical vibration follow-up loop is provided connected to the above series of circuits for compensating the adverse effect of the mechanical interference to prevent the magnetic head from becoming off-track when performing a read/write operation. The follow-up loop is composed of an acceleration sensor 6, mechanical vibration follow-up controller 7, switches 80a and 80b, and adders 8a and 8b. The follow-up loop is connected to both series of circuits through the switches 80a and 80b which are controlled by the magnetic head positioner controller 4a or 4b. The follow-up loop is ON when one of the positioners 20 is performing a read/write operation. Mechanical vibration follow-up signals $\Delta Sa$ or $\Delta Sb$, output from the mechanical vibration follow-up controller 7, are supplied to the adders 8a or 8b, and are added to position error signals $\Delta Pa$ or $\Delta Pb$ output from the positioning controllers 3a or 3b.

Figure 6:
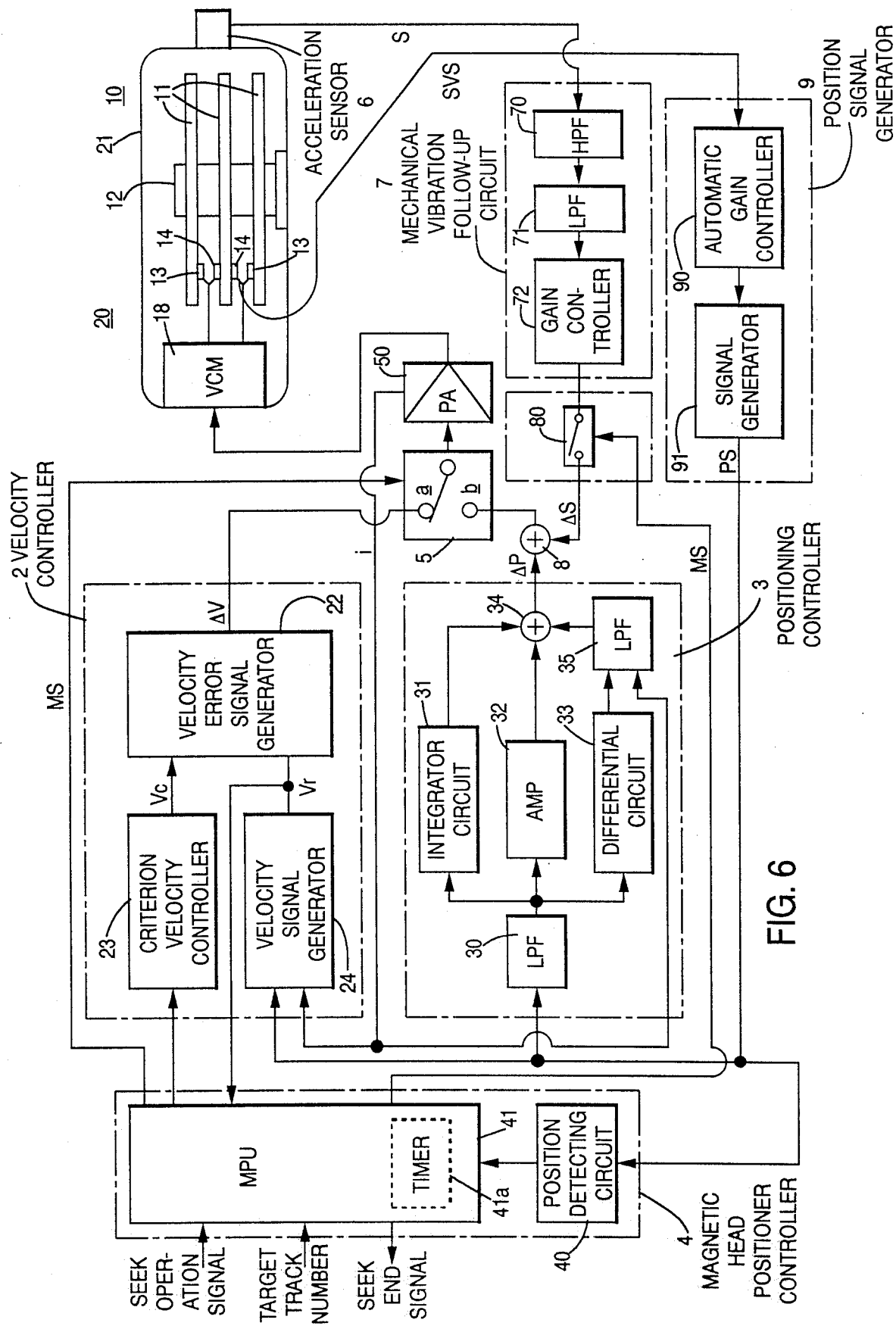
FIG. 6 is a circuit diagram of one of the two series of circuits in the position control system connected to the mechanical vibration follow-up loop shown in FIG. 5.

FIG. 6 is a more detailed circuit diagram of one of the above-described series of circuits in combination with the mechanical vibration follow-up loop shown in FIG. 5. In FIG. 6, the suffix a or b of the reference numerals is dropped.

The magnetic head positioner controller 4 is composed of a position detecting circuit 40 and a microprocessor unit 41 (hereinafter referred to as MPU) which includes a timer 41a. A position signal PS, output from the position signal generator 9, is processed such that the position of the servo-head 14 is detected by the position detecting circuit 40. The processed signal is then input into the MPU 41 through the timer 41a.

The MPU 41 receives and processes a seek operation signal and the position of a target track output from a CPU (not shown) to the magnetic head positioner controller 4. The seek operation signal turns the terminal a of switch 5 ON, which connects the velocity controller 2 to the amplifier 50 to drive the VCM 18 of the positioner 20. When the position detecting circuit 40 detects that the relevant magnetic servo-head 14 is far from the target track, a fine/coarse switching signal MS is output from the MPU 41. This turns the terminal b of the switch 5 ON which connects the positioning controller 3 to the amplifier 50. When a predetermined settling time $t_s$ has elapsed after the issuance of the signal MS, a seek end signal SE is output from the MPU 41 allowing a read/write operation of the magnetic heads 13 to commence.

The velocity controller 2 is a conventional circuit as described before and includes a criterion velocity generator 23, a velocity signal generator 24, and a velocity error signal generator 22. A criterion velocity signal Vc is generated and input to the circuit 2 under control of the MPU 41. A real velocity signal Vr is output from the velocity signal generator 24. The velocity error signal generator 22 takes the difference between the criterion velocity signal Vc and the real velocity signal Vr and generates a velocity error signal ΔV. The velocity error signal ΔV is input to the amplifier 50 through the terminal a of the switch 5 to drive the VCM 18.

During a read/write operation the positioning controller 3 is employed. The positioning controller 3 includes a first low-pass filter 30, an integration circuit 31, an amplifier 32, a differential circuit 33, an adder 34 and a second low-pass filter 35. A position signal PS output from the position signal generator 9 is filtered by the first low-pass filter 30 to eliminate high frequency components thereof. The integration circuit 31 integrates the filtered signal. The differential circuit 33 differentiates the filtered signal which is then filtered by the second low-pass filter 35. The amplifier 32 linearly amplifies the filtered signal. The output currents of these three circuits are then input to and added by the adder 34 and output as a position error signal ΔP.

In the mechanical vibration follow-up loop, an acceleration sensor 6, a mechanical vibration follow-up circuit 7, and a switch 80 are connected in series. The acceleration sensor 6 outputs an acceleration sense signal S when the side wall 21 is subject to a mechanical vibration caused by one of the positioners 20 during a seek operation. The mechanical vibration follow-up circuit 7 comprises a high-pass filter 70, a low-pass filter 71 and a gain controller 72. The direct current component of the sense signal S is eliminated by the high-pass filter 70, and the low frequency component is filtered through the low-pass filter 71 having a low phase shift below 10 degrees and a high gain level in the specified low frequency range. The gain level of the filtered sense signal is controlled by the gain controller 72 to an appropriate level such that the mechanical vibration follow-up signal ΔS is correctly added to the position error signal ΔP by an adder 8. A switch 80 is disposed between the mechanical vibration follow-up circuit 7 and the adder 8, and is opened or closed depending on the absence or the presence of the fine/coarse switching signal MS indicating the change from coarse to fine access.

The position signal generator 9 is a conventional circuit and includes an automatic gain control (AGC) amplifier 90 and a signal generator 91. A servo-signal SVS is sensed by the relevant servo-head 14 engaging a surface of one of the magnetic disks 11 where the signals SVS are recorded. The servo-signal SVS is gain-controlled by the AGC amplifier 90, converted into a position signal PS by the signal generator 91 and input to the magnetic head positioner controller 4 and the fine/-coarse signal velocity controller 2.

Figure 7:
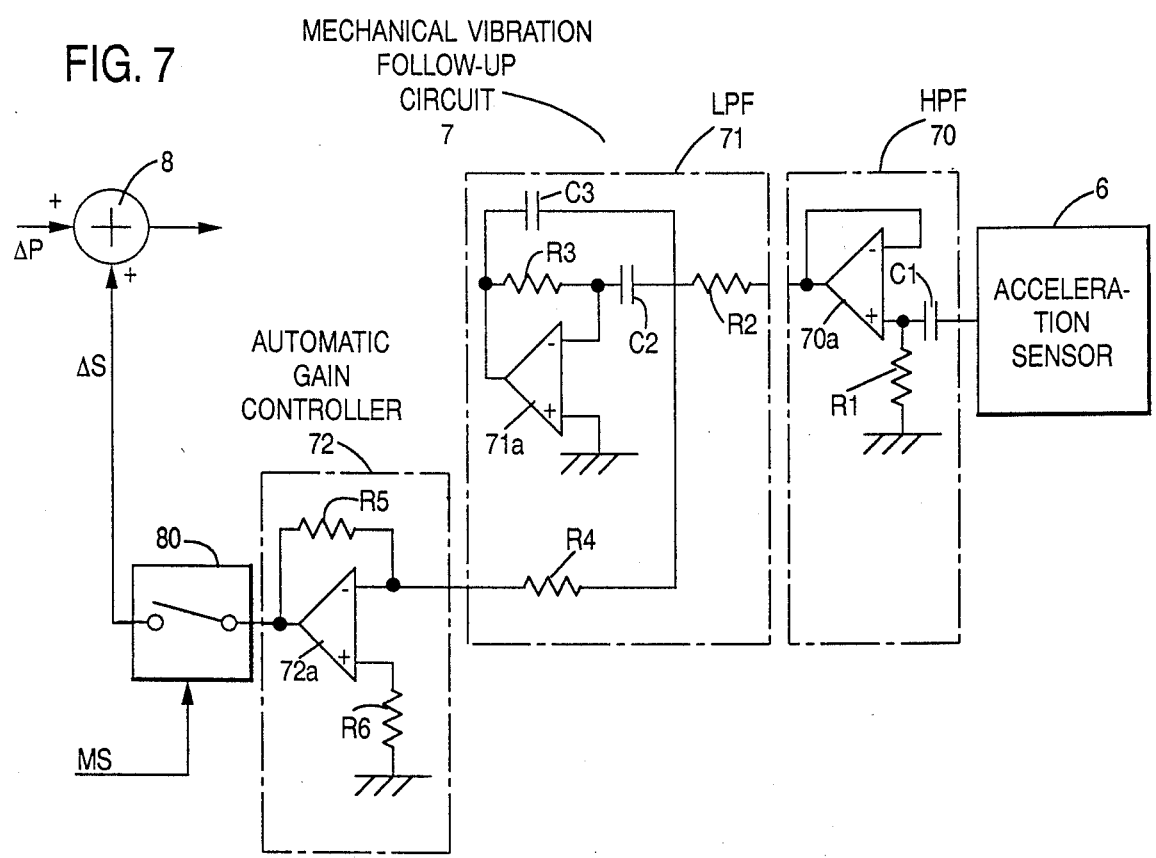
FIG. 7 is a circuit diagram of the acceleration sensor 6 and the mechanical vibration follow-up circuit 7 in the circuit of FIG. 6.

FIG. 7 is a circuit diagram of the acceleration sensor 6 and the mechanical vibration follow-up circuit 7 of FIG. 6. Generally, an acceleration sensor 6 has sense axes along which an acceleration force is most clearly sensed. The acceleration sensor 6 is a conventional sensor available in the market, such as a piezoelectric accelerometer. The acceleration sensor 6 is secured to the outer side wall of the housing 21 such that the sense axis thereof coincides with the seek direction of the positioner 20. The acceleration sensor 6 includes circuits for stabilizing the output of the sensor 6, such as a charge amplifier and voltage amplifier (both not shown). Of course, the acceleration sensor 6 may be secured to the inside wall of the housing 21.

The high-pass filter 70 is an active filter passing high frequency components and including an operation amplifier 70a, a condenser C1, and a resistor R1. The low-pass filter 71 is a second order active filter including an operation amplifier 71a, a condenser C2, a resistor R3, a condenser C3, and a resistor R4 as shown in FIG. 7. The gain controller 72 includes an operation amplifier 72a and resistors R5 and R6. The gain level can be set by properly selecting the resistor R5 and the ratio of the resistor R2 to the resistor R4.

The characteristics of the low-pass filter 71 are a very important factor of the present invention. Assuming that R2=R4 and C2=C3, the gain of the filter 71 is represented below:

$$G(s) = \frac{G_0 \cdot b}{S^2 + as + b} = \frac{\frac{R_5}{2R_2} \cdot \frac{2}{R_2 R_3 C_2^2}}{S^2 + \frac{2}{R_3 C_2} S + \frac{2}{R_2 R_3 C_2^2}}$$

whereby, $G_0 = R_5/2R_2$, represents a direct gain.

A cut-off frequency $f_0$, and a damping coefficient Q are given as follows:

$$f_0 = \frac{\omega_0}{2\pi} = \frac{1}{2\pi}\sqrt{b} = \frac{1}{2\pi}\sqrt{\frac{2}{R_2 R_3 C_2^2}}$$

$$= \frac{1}{\pi C}\sqrt{\frac{1}{2R_2 R_3}}$$

$$Q = \frac{\sqrt{b}}{a} = \sqrt{\frac{2}{R_2 R_3 C_2^2}} \cdot \frac{R_3 C_2}{2} = \sqrt{\frac{R_3}{2R_2}}$$

Thus, the cut-off frequency and the damping coefficient are selectively determined by selecting the values of R2(=R4), R3, and C2(=C3).

Figure 8A:
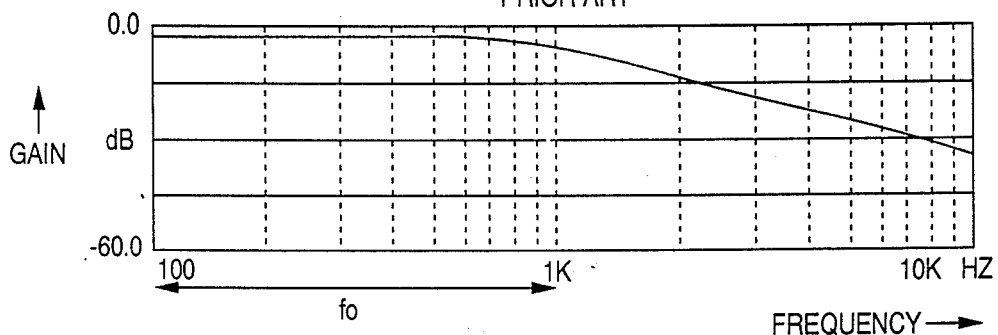
FIGS. 8(a) and 8(b) are graphs of the frequency characteristics of a typical low-pass filter currently used in the art.
Figure 8B:
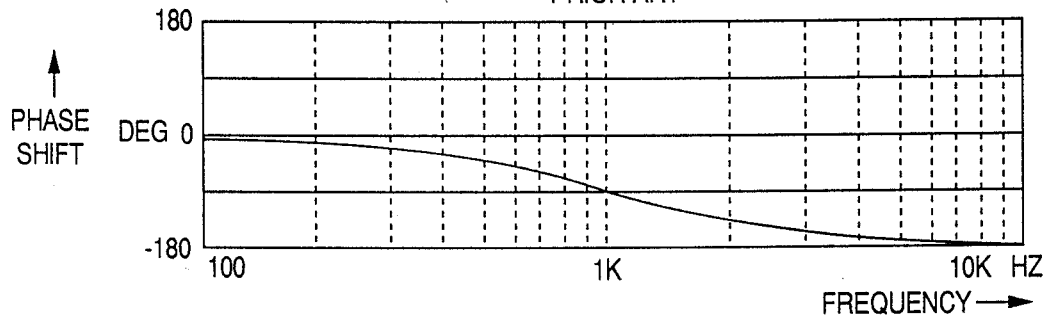

FIGS. 8(a) and 8(b) are diagrams of the frequency characteristics of a typical low-pass filter currently used in the art having a damping factor Q=0.7 and a cut-off frequency $f_0$ of 980 Hz. A low-pass filter is generally designed to have a substantially flat gain characteristic in a low frequency range below 1 KHz as shown in FIG. 8(a). On the other hand, phase shift characteristics are not desirable, as shown in FIG. 8(b), where a considerable phase shift appears in the range above approximately 200 Hz. A low-pass filter having the characteristic of a high phase shift in the specified low frequency range is not suitable for the low-pass filter to be used in the mechanical vibration follow-up circuit 7 because this delays the feedback of the mechanical vibration follow-up signal ΔS. This results in unfavorable compensation of the mechanical vibration of the magnetic disk storage apparatus and fails to prevent the servo-head 14 from becoming off-track. According to the experience of the inventors, an allowable phase shift is limited to below 10 degrees. If this limitation is applied to the above-described conventional low-pass filter, the effective frequency range is limited below 150 Hz as shown in FIG. 8(b), which is not acceptable for the low-pass filter 71 of the present invention.

Figure 9A:
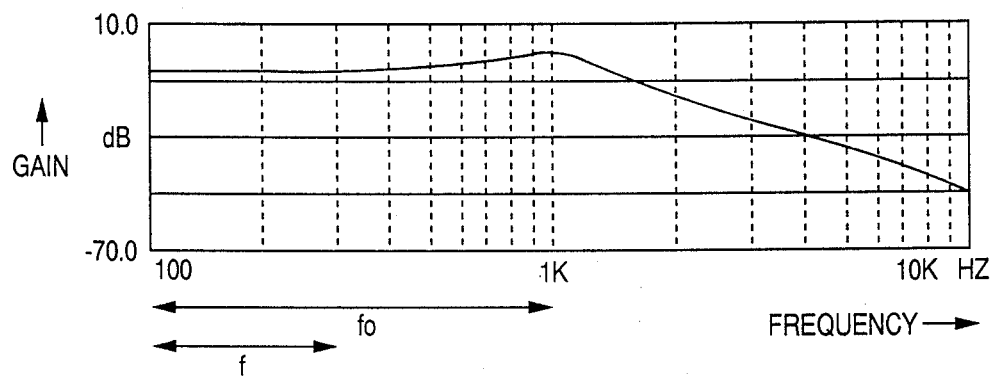
FIGS. 9(a) and 9(b) are graphs of the frequency characteristics of the low-pass filter 71 used in the present invention.
Figure 9B:
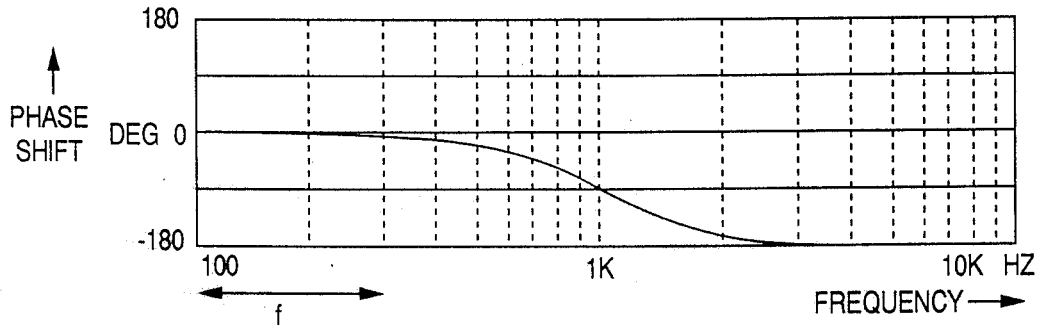

FIGS. 9(a) and 9(b) are diagrams of the frequency characteristics of the low-pass filter 71 of the present invention having a damping factor Q=1.76 and a cut-off frequency $f_0$ of 980 Hz. As shown in FIG. 9(a), the gain slightly increases in a frequency range near the cut-off frequency $f_0$ of 1 KHz, but the gain in a low frequency range, approximately from 100 Hz to 300 Hz, is substantially high, and the gain in a frequency range exceeding 1 KHz is substantially low. As shown in FIG. 9(b), the phase shift in the above frequency range from 100 Hz to 300 Hz is small and is limited below 10 degrees. Therefore, this is greatly improved over the conventional low-pass filter. In conclusion, the low-pass filter 71 according to the present invention has a high gain and low phase shift in a low frequency range which is from $\frac{1}{3}$ to 1/10 the cut-off frequency. This is favorable for the mechanical vibration follow-up circuit of the present invention. Very low gain in a high frequency range over a cut-off frequency is favorable for eliminating high frequency signals. According to the inventors' study, a damping coefficient Q ranging from 1.5 to 2.0 is most desirable for a low-pass filter in the mechanical vibration follow-up circuit of the present invention. The low-pass filter 71 does not always have the structure as illustrated in FIG. 7. A low-pass filter having a different circuit composition and elements, but similar operating characteristics, is applicable to the present invention.

The operation of a magnetic disk storage apparatus according to the present invention, shown in FIG. 3(b), FIG. 5 and FIG. 6 is now explained. It is assumed that the positioner 20a is performing a seek operation and the positioner 20b is performing a read/write operation. The magnetic head positioner controller 4a does not issue a fine/coarse switching signal MSa and the controller 4b issues a fine/coarse switching signal MSb. During the absence of the signal Msa and the presence of the signal Msb, the terminal a of the switch 5a and the terminal b of the switch 5b are closed, and the switch 80a is opened and the switch 80b is closed. The velocity error signal $\Delta V_a$ is input to the power amplifier 50a through the closed terminal a of the switch 5a. The position error signal $\Delta Pb$ is output from the positioning controller 3b in a conventional manner, and is input to the power amplifier 50b through the adder 8b and the terminal b of the switch 5b. Thus, the VCM 18a is driven by the velocity error signal $\Delta V_a$, and the VCM 18b is driven by the position error signal $\Delta Pb$.

The positioner 20a causes mechanical vibration which is sensed by the acceleration sensor 6. A sensing current S is output from the sensor 6 and input by the vibration follow-up circuit 7. The sensing current S is filtered by the low-pass filter 71, having a proper gain level set by the gain controller 72, and is converted into a mechanical vibration follow-up signal $\Delta S$. The signal $\Delta S$ is input to the adder 8b through the closed switch 80b. Both signals $\Delta S$ and $\Delta Pb$ are added in the adder 8b. The current output from the adder 8a is input to the power amplifier 50b to drive the VCM 18b of the positioner 20b such that the effect of the mechanical vibration is compensated, resulting in good tracking of the magnetic head 14b.

Figure 10A:
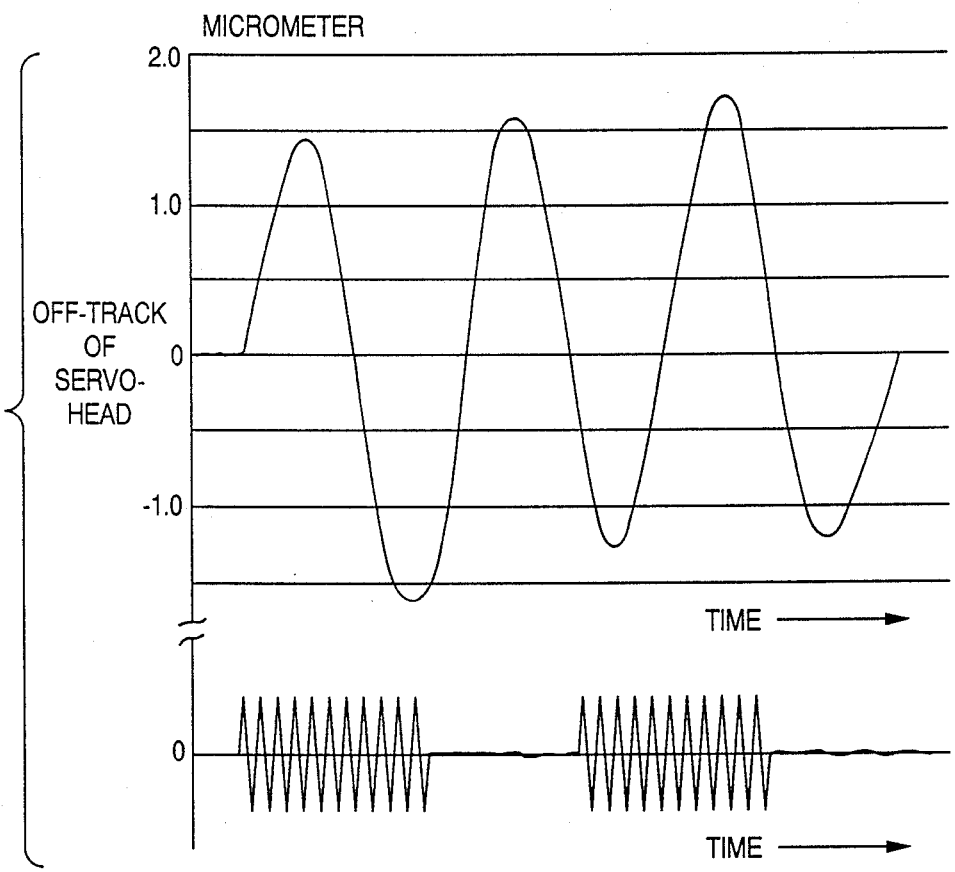
FIG. 10(a) is a graph of the height of position error signals during a read/write operation with respect to a prior art magnetic disk storage apparatus without a mechanical vibration follow-up loop.
Figure 10B:
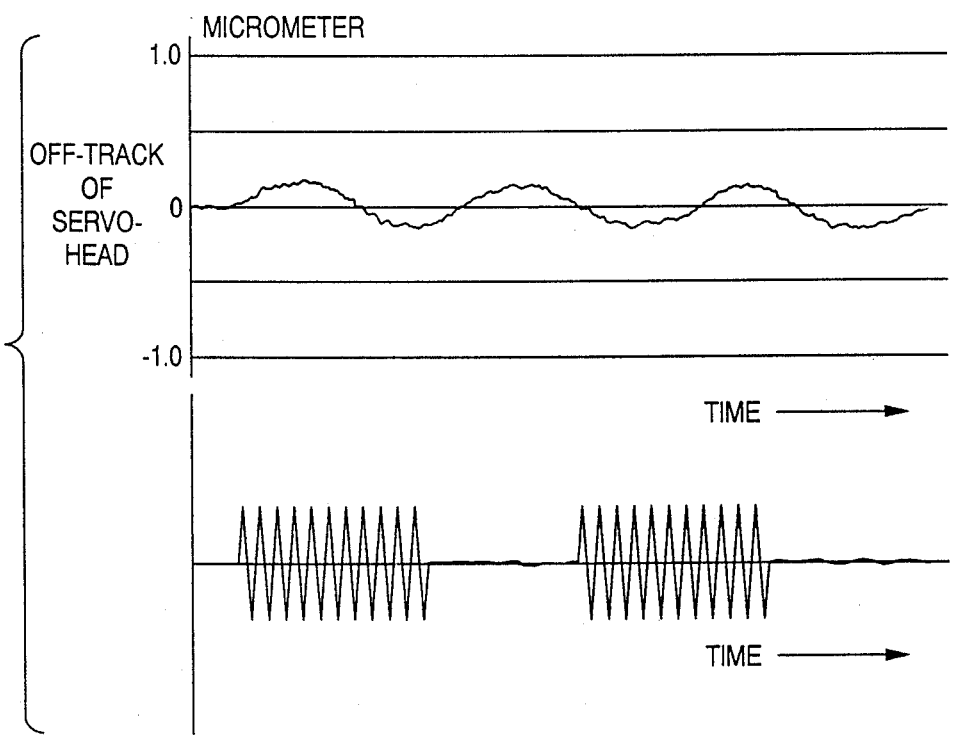
FIG. 10(b) is a graph of the height of position error signals during a read/write operation with respect to a magnetic disk storage apparatus of the present invention including a mechanical vibration follow-up loop.

The effect of the mechanical vibration follow-up loop of the magnetic positioner control system of the present invention is confirmed by studying the following-up capability of the magnetic head. FIGS. 10(a) and 10(b) are graphs of the height of position error signals $\Delta Pb$ (lower portion) during a read/write operation, and $\Delta Pa$ (upper portion) during a simultaneous seek operation with respect to time. The position error signal is proportional to the distance when the magnetic head is off-track. A magnetic head that is off-track in a prior magnetic disk storage apparatus without a mechanical vibration follow-up loop is shown in FIG. 10(a). A magnetic head that is off-track in a magnetic disk storage apparatus according to the present invention including a mechanical vibration follow-up loop is shown in FIG. 10(b). In the diagrams, the scale of the off-track servo-head 14a during a seek operation is intentionally reduced for convenience as compared with that of the servo-head 14b during the read/write operation.

In response to the repeated seek operation of the positioner 20a, the magnetic head 14b is subject to becoming off-track. The peak-to-peak amplitude of the off-track of the prior art magnetic disk storage apparatus is approximately 2 to 3 micrometers as shown in FIG. 10(a), while that of the present invention is substantially reduced to a value below 0.5 micrometers as shown in FIG. 10(b). As a result, in a multi-positioner magnetic disk storage apparatus off-track of a magnetic head during a read/write operation caused by a simultaneous seek operation of another positioner is favorably solved by the present invention.

Figure 11:
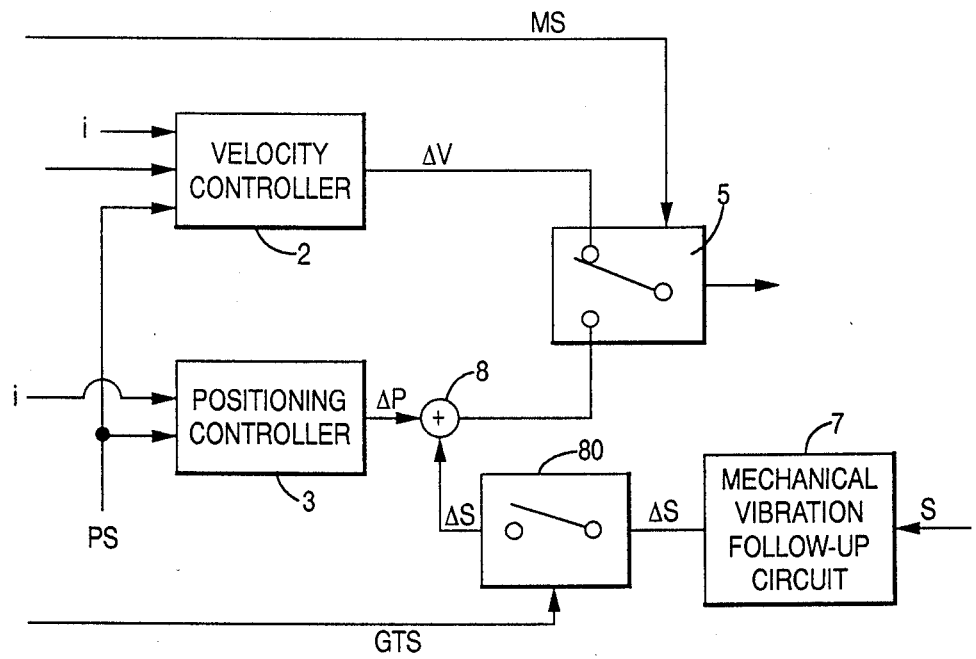
FIG. 11 is a block diagram of a portion of a magnetic disk storage apparatus according to a second embodiment of the present invention, including a switch.

In a second embodiment of the present invention, an improvement is added to the first embodiment. FIG. 11 is a circuit diagram of the second embodiment. In the first embodiment, the switch 80a or 80b is controlled by a fine/coarse switching signal Ms. In the second embodiment, the switch 80a or 80b is controlled by a gate signal GTS output from the magnetic head positioner controller 4. When the settling time $t_s$ is prolonged due to factors other than the mechanical vibration detected by the sensor 6, such as a violent external force, a predetermined settling time is set first by the signal GTS. The switch 80 is closed when the gate signal GTS is input to the switch 80, and the signal $\Delta S$ is input to the adder 8 through the switch 80.

In the present invention, the acceleration sensor 6 is used to detect the mechanical vibration of the magnetic disk storage apparatus by sensing vibration in the form of acceleration. However, a displacement sensor can be used instead of the acceleration sensor 6. The detected current indicating vibration amplitude of the housing would be differentiated by a differential circuit to convert the displacement current to an acceleration current.

Figure 12:
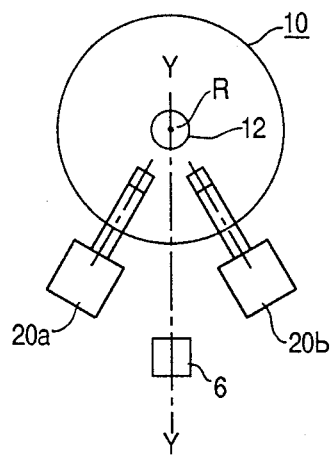
FIG. 12 is a plan view of an arrangement of magnetic head positioners disposed in a plane in a centripetal configuration.

The above-described magnetic disk storage apparatus set forth in the first and second embodiments is assumed to have two linear type positioners stacked one above the other. However, the present invention is applicable to a multi-positioner magnetic disk storage apparatus having more than two positioners. Further, the present invention is also applicable to a magnetic disk storage apparatus wherein a number of positioners are disposed on a plane in a symmetrical arrangement as shown in the schematic plan view of FIG. 12. The access direction of each positioner 20a or 20b is arranged centripetally, that is, directed toward a common point, e.g., the rotating center R of the magnetic disk assembly 10. The mechanical vibration sensor 6 is positioned on the symmetrical axis Y—Y of the arrangement. The usable maximum angle between the symmetrical axis and the access direction of the positioner is optimally 30 degrees in order to obtain the best operation of the present invention.

Figure 13:
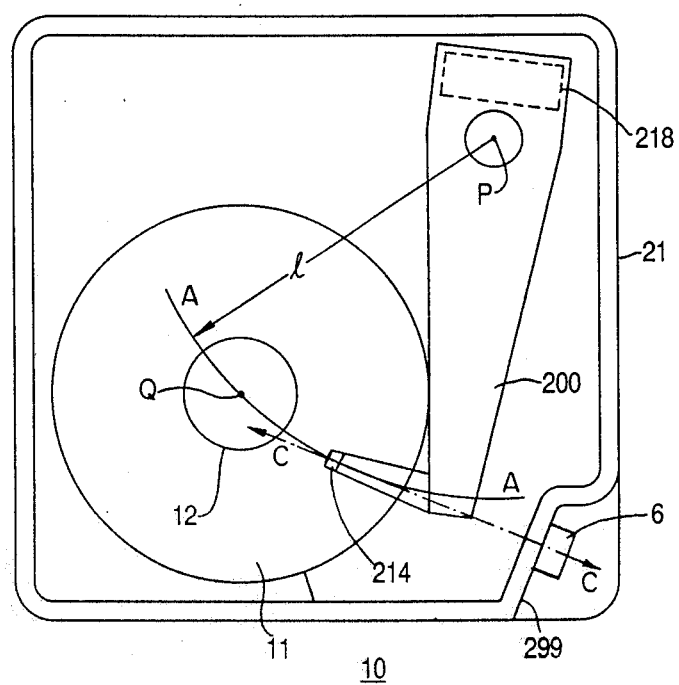
FIG. 13 is a plan view of a multi-positioner magnetic disk storage apparatus having a rotary positioner, to which the present invention is applied.

Further, the present invention is applicable to a multi-positioner magnetic disk storage apparatus having rotary positioners as shown in the schematic plan view in FIG. 13. The apparatus has two rotary positioners 200 rotatable around a center P by a VCM 218. A servo-head 214 engages the surface of magnetic disks 11 stacked in a magnetic disk assembly 10 having a spindle 12 which rotates around a center Q. The magnetic head 214 is transferred along an arc orbit A—A having a center at the rotation center P of the positioner 200 and crossing the center point Q. The access direction of the magnetic head 214, therefore, is successively directed along a tangent of the arc A—A at each position on the arc A—A and slightly changing depending on the position of the magnetic head 214. The positioner 200 and the magnetic disk assembly 10 are enclosed in a housing 21. An acceleration sensor 6 is disposed on an outside wall of the housing 21 at a depressed portion 299 which is formed such that the sensing direction of the acceleration sensor 6 coincides with an average access direction indicated by the line C—C through the magnetic head 214. In such a configuration, the coil current for driving the VCM 218 is compensated by a compensating current $i_{com}$ in a manner similar to that described in the first embodiment such that the magnetic head 214, during a read/write operation, does not become off-track due to a simultaneous seek operation of another positioner. The compensating current is determined by the following formula:

$$i_{comp} = KJa/Blr.$$

where
- Blr: torque constant of positioner 200
- J: moment of inertia
- K: a constant
- a: detected acceleration.

It is apparent that the present invention is also applicable to a magnetic disk storage apparatus having a single linear or rotary magnetic head positioner. The mechanical vibration is caused by an external force exerted on the apparatus. The same vibration follow-up system and suspension structure for the magnetic head positioner as those set forth in the first embodiment can be used. In particular, the low-pass filter 71 included in the mechanical vibration follow-up circuit 7, shown in FIG. 7, is substantially effective for cancelling an effect of the vibration in a low frequency range which would adversely affect the tracking of a magnetic head.

The foregoing is considered as illustrative only of the principles of the invention. Further, since numerous changes and modifications will readily occur to those skilled in the art, it is not desired to limit the invention, and accordingly all suitable modifications and equivalents may be resorted to, falling within the scope of the invention, the appended claims and their equivalents.

What is claimed is:

1. A magnetic disk storage apparatus comprising:
   a magnetic disk assembly including:
   a plurality of magnetic disks;
   a plurality of magnetic head positioners, each of said magnetic head positioners including driving means and each of said magnetic head positioners being driven by said driving means independently of each other to position a magnetic head supported by each of said magnetic head positioners over a surface of said magnetic disks; and
   a housing enclosing said magnetic head positioners and said magnetic disks and securing said magnetic head positioners thereto;
   mechanical vibration follow-up system means for reducing interference of mechanical vibration caused by a start of seek operation of a first one of said magnetic head positioners and partially transferred through said housing and imposed on a second one of said magnetic head positioners which is not secured, said mechanical vibration follow-up system means, including:
   sensor means, coupled to said housing, for sensing mechanical vibration of the housing in an access direction and outputting a sense current; and
   signal processing circuit means, operatively connected to said sensor means and to said driving means, for receiving the sense current, generating a compensating signal proportional to the sense current for following up the mechanical vibration, and outputting the compensating signal to said driving means for driving a second one of said magnetic head positioners for compensating any off-track caused by mechanical vibration of said housing of a magnetic head supported by said second one of said magnetic head positioners.

2. A magnetic disk storage apparatus according to claim 1, wherein said sensor means comprises an acceleration sensor including a piezoelectric accelerometer.

3. A magnetic disk storage apparatus according to claim 2, wherein said compensating signal is a current compensating signal $i_{comp}$ determined by the following formula:

$$i_{comp} = ma/Bl$$

where
- m: mass of the moving portion of said magnetic head positioner;
- a: acceleration detected based on the sense signal; and
- Bl: positioner force constant of said magnetic head positioner.

4. A magnetic disk storage apparatus according to claim 1, wherein said sensor means comprises an a displacement sensor.

5. A magnetic disk storage apparatus according to claim 1, wherein said sensor means is secured to a surface of said housing.

6. A magnetic disk storage apparatus according to claim 5, wherein said plurality of magnetic head positioners are linear type positioners having linear access movement and stacked vertically one above another, the sense axis of said sensor means coinciding with the direction of the linear access movement of said plurality of magnetic head positioners.

7. A magnetic disk storage apparatus according to claim 5, wherein said plurality of magnetic head positioners are linear type positioners having linear access movement and disposed horizontally on a plane in a centripetal, symmetrical arrangement with respect to a symmetry axis, the sense axis of said sensor means coinciding with the symmetry axis of the arrangement of said plurality of magnetic head positioners.

8. A magnetic disk storage apparatus according to claim 1, wherein said mechanical vibration resonant frequency of said magnetic head positioners is included within a specified low frequency range.

9. A magnetic disk storage apparatus according to claim 1, wherein said driving means includes a motor having a coil, and wherein said signal processing circuit comprises:
   a mechanical vibration follow-up circuit, operatively connected to said sensor means, for receiving the sense current and generating the compensating signal being proportional to the sense current;

a positioning controller, coupled to said mechanical vibration follow-up circuit, for generating a position error signal; and a plurality of adders, each of which is operatively connected to said mechanical vibrations follow-up circuit, said positioning controller, and said driving means of each of said magnetic head positioners, said adders adding the compensating signal at least to the position error signal and outputting a signal for driving said driving means, a coil current of the coil of the motor of said second one of said magnetic head positioners being compensated such that the effect of the mechanical vibration is cancelled.

10. A magnetic disk storage apparatus according to claim 9, further comprising magnetic head positioner controllers, provided for each of said magnetic head positioners for controlling each of said magnetic head positioners, wherein said signal processing circuit further comprises a plurality of switches each of which is disposed between said mechanical vibrations follow-up circuit and each of said adders, said plurality of switches being controlled by said magnetic head positioned controllers.

11. A magnetic disk storage apparatus according to claim 10, wherein the compensating signal is a current compensating signal $i_{comp}$ determined by the following formula:

$$i_{comp} = ma/Bl$$

where
- m: mass of the moving portion of said magnetic head positioner;
- a: acceleration detected based on the sense signal; and
- Bl: positioner force constant of said magnetic head positioner.

12. A magnetic disk storage apparatus according to claim 9, wherein said plurality of magnetic head positioners are rotary type positioners and are rotatable around a center point, the magnetic heads supported by said magnetic head positioners being transferred along the surface of one of said magnetic disks following an arc orbit having successively changing access directions which are represented by an average access direction.

13. A magnetic disk storage apparatus according to claim 9, wherein said mechanical vibration follow-up circuit comprises:

a high-pass filter, operatively connected to said sensor means, for eliminating a direct current component of the sense current;

a low-pass filter, operatively connected to said high-pass filter, for filtering a low frequency component of the sense current output from said sensor means; and a gain controller, operatively connected to said low-pass filter, for controlling the gain level of the sense signal filtered by said low-pass filter.

14. A magnetic disk storage apparatus according to claim 13, wherein said low-pass filter has a low phase shift below 10 degrees and a high gain level in a specified low frequency range.

15. A magnetic disk storage apparatus according to claim 14, wherein the mechanical vibration resonant frequency of said magnetic head positioners is included within the specified low frequency range.

16. A magnetic disk storage apparatus according to claim 1, wherein said plurality of magnetic head positioners are rotary type positioners and are rotatable around a center point, said magnetic heads supported by said magnetic head positioners being transferred along the surface of one of said magnetic disks following an arc orbit having successively changing access directions which are represented by an average access direction.

17. A magnetic disk storage apparatus according to claim 16, the compensating signal being determined by a current $i_{comp}$ in accordance with the following formula:

$$i_{comp} = KJa/Blr$$

where
- Blr; torque constant of said magnetic head positioner;
- a: acceleration detected based on the sense signal;
- J: rotation inertia momentum of said magnetic head positioner; and
- K: a constant.

18. A magnetic disk storage apparatus having a magnetic disk assembly including a plurality of magnetic disks, a magnetic head positioner which is driven by a driving means to position a magnetic head supported thereby, and a housing enclosing and securing thereto the magnetic disk assembly and the magnetic head positioner, said magnetic disk storage apparatus comprising:

a mechanical vibration follow-up system comprising:

sensor means for sensing mechanical vibration of the housing in an access direction and outputting a sense current, the mechanical vibration being caused by a force exerted on said magnetic disk storage apparatus; and a signal processing circuit, operatively connected to said sensor means, for receiving the sense current, generating a compensating signal proportional to the sense current for following up the mechanical vibration, and transferring the compensating signal to the driving means for driving the magnetic head positioner and compensating the magnetic head supported by the magnetic head positioner which is off-track due to mechanical vibration; and suspending means for securing the housing to the magnetic positioner, said suspending means including:

a plurality of spring members; and a plurality of damping members causing a low mechanical vibration resonant frequency of the magnetic head positioners.

19. A magnetic disk storage apparatus according to claim 18, wherein said signal processing circuit comprises:

a high-pass filter, operatively connected to said sensor means, for eliminating a direct current component of the sense current;

a low-pass filter, operatively connected to said high-pass filter, for filtering a low-frequency component of the sense current output from said sensor means; and a gain controller, operatively connected to said low-pass filter, for controlling the gain level of the sense current filtered by said low-pass filter.

20. A magnetic disk storage apparatus according to claim 19, wherein said low-pass filter has a log phase shift below 10 degrees and a high gain level in a specified low frequency range.

21. A magnetic disk storage apparatus, comprising:
a magnetic disk assembly, including:

a plurality of magnetic disks;

a plurality of magnetic head positioners, coupled to said plurality of magnetic disks;

a plurality of magnetic heads respectively supported by said plurality of magnetic head positioners;

first driving means, operatively connected to said plurality of magnetic head positioners, for independently driving and positioning each of said magnetic heads; and a housing for enclosing and securing said magnetic disk assembly and said magnetic head positioners;

a mechanical vibration follow-up system including:

sensor means, coupled to said housing, for sensing mechanical vibration of said housing in an access direction and outputting a sense current, the mechanical vibration being caused by the start of a seek operation of a first magnetic head positioner selected from said plurality of magnetic head positioners:

a signal processing circuit, operatively connected to said sensor means, for receiving the sensed current, generating a compensating signal proportional to the sensed current for following-up the mechanical vibration, and outputting the compensating signal; and second driving means, connected to said signal processing circuit and said plurality of magnetic head positioners, for driving a second magnetic head positioner selected from said plurality of magnetic head positioners which is not selected for the seek operation, for compensating any off-track caused by the mechanical vibration of one of said mechanical heads supported by said second magnetic head positioner; and suspending means, said plurality of magnetic head positioners being secured to said housing through said suspending means, said suspending means including:

a plurality of spring members connected to said housing; and a plurality of damping members connected to said housing.

22. A magnetic disk storage apparatus according to claim 21, wherein said sensor means comprises an acceleration sensor.

23. A magnetic disk storage apparatus according to claim 22, wherein said acceleration sensor includes a piezoelectric accelerometer.

24. A magnetic disk storage apparatus according to claim 21, wherein said acceleration sensor includes a displacement sensor.

25. A magnetic disk storage apparatus according to claim 21, wherein said sensor means is secured to a surface of said housing.

26. A magnetic disk storage apparatus according to claim 21, wherein said plurality of magnetic head positioners are linear-type positioners having a linear access movement and stacked vertically, one above another, the sense axis of said sensor means coinciding with the direction of the linear access movement of said plurality of magnetic head positioners.

27. A magnetic disk storage apparatus according to claim 21, wherein said plurality of magnetic head positioners are linear-type positioners having a linear access movement and disposed horizontally on a plane in a centripetal, symmetrical arrangement with respect to a symmetry axis, the sense axis of said sensor means coinciding with the symmetry axis of said plurality of magnetic head positioners.

28. A magnetic disk storage apparatus according to claim 21, wherein said first and second driving means include a motor having a coil, and wherein said signal processing circuit comprises:

a mechanical vibration follow-up circuit, operatively connected to said sensor means, for receiving the sensed current and generating the compensating signal proportional to the sensed current;

a positioning controller, operatively connected to said mechanical vibration follow-up circuit, for generating a position error signal; and a plurality of adders, each of said adders being operatively connected to said mechanical vibration follow-up circuit, said positioning controller, and said first driving means of said magnetic head positioners, each of said adders adding the compensating signal at least to the position error signal and outputting a signal for driving said first driving means, a coil current of the coil in said motor in said second driving means for said second magnetic head positioner being compensated such that the mechanical vibration is cancelled.

29. A magnetic disk storage apparatus according to claim 28, further comprising magnetic head positioner controllers, connected to each of said magnetic head positioners, for controlling each of said magnetic head positioners, wherein said signal processing circuit further comprises a plurality of switches disposed between said mechanical vibration follow-up circuit and each of said adders, said plurality of switches being controlled by said magnetic head positioner controllers.

30. A magnetic disk storage apparatus according to claim 28, wherein said mechanical vibration follow-up circuit comprises:

a high-pass filter, operatively connected to said sensor means, for eliminating a direct current component of the sensed current;

a low-pass filter, operatively connected to said high-pass filter, for filtering a low frequency component of the sensed current output from said sensor means; and a gain controller, operatively connected to said low-pass filter, for controlling the gain level of the sensed current filtered by said low-pass filter.

31. A magnetic disk storage apparatus according to claim 30, wherein said low-pass filter has a low phase shift below 10 degrees and a high gain level in a specified low frequency range.

32. A magnetic disk storage apparatus according to claim 28, wherein said magnetic head positioners output a position signal, and wherein said positioning controller comprises:

a low-pass filter, operatively connected to receive the position signal and outputting a filtered signal;

an integration circuit, operatively connected to said low-pass filter, for receiving and integrating the filtered signal and outputting an integrated signal;

an amplifier, operatively connected to said low-pass filter, for receiving and amplifying the filtered signal and outputting an amplified signal;

a differential circuit, operatively connected to said low-pass filter, for receiving and differentiating the filtered signal and outputting a differentiated signal; and an adder, operatively connected to said integration circuit, amplifier and differential circuit, for adding the integrated signal, amplified signal, and differentiated signal and outputting a position error signal.

33. A magnetic disk storage apparatus, comprising:
a magnetic disk assembly, including:
  a plurality of magnetic disks;
  plurality of magnetic heads coupled to said plurality of magnetic disks;
  a plurality of magnetic head positioners, for supporting said plurality of magnetic heads, each of said magnetic head positioners including driving means for independently driving said magnetic head positioners to position respective ones of said magnetic heads over said magnetic disks;
  housing means for enclosing and securing said magnetic head positioners and said magnetic disks; and
  a plurality of suspending means for securing said magnetic positioners to said housing by suspension, said suspending means comprising a plurality of spring members and a plurality of damping members, causing a low mechanical vibration resonant frequency of magnet and head positions; and
mechanical vibration follow-up system means operatively connected to said plurality of driving means for reducing interference of mechanical vibration between said magnetic head positioners, said interference being caused by the start of a seek operation of a selected one of said magnetic head positioners and imposed on other ones of said magnetic head positioners which are not selected.

34. A magnetic disk storage apparatus according to claim 33, wherein said mechanical vibration follow-up system means includes:
  sensor means, coupled to said housing, for sensing mechanical vibration of said housing in an access direction and outputting a sense current, the mechanical vibration being caused by the start of a seek operation of a magnetic head positioner selected from said plurality of magnetic head positioners;
  a signal processing circuit, operatively connected to said sensor means, for receiving the sensed current, generating a compensating signal proportional to the sensed current for follow-up the mechanical vibration, and outputting the compensating signal; and
  second driving means, connected to said signal processing circuit and said plurality of magnetic head positioners, for driving a second magnetic head positioner selected from said plurality of magnetic head positioners which is not selected for the seek operation, for compensating any off-track caused by the mechanical vibration of one of said mechanical heads supported by said second magnetic head positioner.

35. A magnetic disk storage apparatus having a magnetic disk assembly including a plurality of magnetic disks, a plurality of magnetic head positioners, each of the magnetic head positioners being driven independently of each other to position a magnetic head supported by the magnetic head positioners, and a housing enclosing the positioners and securing the magnetic disk assembly and magnetic head positioners, said magnetic disk storage apparatus comprising:
  a mechanical vibration follow-up system, including:
    sensor means, coupled to the housing, for sensing mechanical vibration of the housing in an access direction and outputting a sense current, the mechanical vibration being caused by the start of a seek operation of a first magnetic head positioner included in the plurality of magnetic head positioners;
    a signal processing circuit, operatively connected to said sensor means, for receiving the sense current, generating a compensating signal proportional to the sense current for following up the mechanical vibration, and outputting the compensating signal; and
    driving means, connected to said signal processing circuit and the plurality of magnetic head positioners, for driving a second magnetic head positioner, selected from the plurality of magnetic head positioners which is not selected for the seek operation, and for compensating any off-track caused by mechanical vibration of the housing of a magnetic head supported by the second magnetic head positioner; and
  suspending means, said plurality of magnetic head positioners being secured to said housing through said suspending means, said suspending means including:
    a plurality of spring members; and
    a plurality of damping members, said spring and damping members causing a low mechanical vibration resonant frequency of said plurality of magnetic head positioners.

* * * * *

UNITED STATES PATENT AND TRADEMARK OFFICE
CERTIFICATE OF CORRECTION

PATENT NO. : 4,967,293
DATED : OCTOBER 30, 1990
INVENTOR(S) : KEIJI ARUGA ET AL.

It is certified that error appears in the above-identified patent and that said Letters Patent is hereby corrected as shown below:

Title Page, Col. 2, "FOREIGN PATENT DOCUMENTS",
line 3, after the last document, insert the the following which were inadvertently omitted by the U.S. Patent and Trademark Office:

--0121578  6/1985  Japan.
  0170967  8/1986  Japan.--.

Col. 2, line 46, "19a and 9b," should be --119a and 119b,--.

Col. 3, line 21, "FIG. I" should be --FIG. 1--.

Col. 4, line 41, "Moriva" should be --Moriya--.

Col. 9, line 2, "2" should be --23--.

Col. 14, line 37, delete "an·".

Col. 15, line 22, "positioned" should be --positioner--.

Signed and Sealed this

Eleventh Day of August, 1992

*Attest:*

DOUGLAS B. COMER

*Attesting Officer*    Acting Commissioner of Patents and Trademarks